United States Patent Office 2,978,361
Patented Apr. 4, 1961

2,978,361
PROCESS FOR THE SURFACE TREATMENT OF METALS

Alois Seidl, Lam, Germany, assignor to Deutsche Gold- und Silber-Scheideanstalt vormals Roessler, Frankfurt am Main, Germany No Drawing. Filed Sept. 3, 1957, Ser. No. 681,464
Claims priority, application Germany Mar. 19, 1954

9 Claims. (Cl. 117—127)

The present invention relates to an improved process for the production of surface coatings on metals by applying a silicate coating from solutions.

Generally, surface coatings of metal oxides which, for example, contain silicon dioxide or titanium dioxide have been applied to metals to alter the surface characteristics thereof, for example, for smoothing the surface, protecting the surface against mechanical and chemical attack, and altering the reflectivity, the heat loss or the passage of electricity. Such oxide coatings were especially applied to thin metal layers, such as, for example, are obtained by evaporating metals onto surfaces, by evaporating such oxides onto such thin metal layers. The production of such layers or coatings is relatively expensive and the thickness thereof is limited in many instances as thicker coatings thus applied are no longer sufficiently transparent to have the color of the coated metal and remain unaltered.

It is an object of the present invention to provide an improved and simple process for coating metals.

According to the invention, a coating is produced on metal surfaces from an alkaline treating solution, which coating contains an alkali metal silicate and in addition thereto at least one other metal, either partially or wholly in the form of its silicate. Preferably, the alkali metal silicate is one in which the proportion of alkali metal oxide to silicon dioxide is 1:2.5 to 1:5. The additional metal is a heavy metal having a density of 4 g. per cc. and preferably one which in aqueous solution is capable of delivering ions of at least two different valences. Coatings according to the invention also can be obtained with treating solutions containing silver or zinc as the heavy metal constituent. Multivalent heavy metals which can be employed according to the invention, for example, are As, Bi, Co, Cr, Cu, Fe, Mn, Mo, Ni, Pb, Sb, Sn and V. A plurality of such metals can in certain instances also be used, such as, for example, cobalt and zinc or chromium and iron or arsenic and copper. The quantity of heavy metal added is relatively minute and should be 0.05% to 2%, preferably 0.2% to 1% based upon the quantity of alkali metal silicate.

It was unexpectedly found that the coatings produced according to the invention, which can be considered mixed silicate coatings, have excellent adherence to the metal base. The mixed silicate coating obtained can be as thin as those which are obtained by evaporation of coating materials onto the surface of the base. Such thin coatings offer good protection to the metal base applied, whether it be in compact form or a thin layer which has been evaporated on, against mechanical and chemical influences. It is however also possible to produce thicker mixed silicate coatings according to the invention without deleterious effect upon their adherence to the base. Coatings under 1 micron thick exhibit interference colors, those between 0.001 to 0.1 mm. thick are glass clear. Thicker coatings, for example, up to 0.5 mm. thick, exhibit increasing self color with increasing thickness.

In contradistinction to other known processes in which, for example, silica coatings are produced on glass by applying a silicate and in a second step dissolving out the alkali or alkaline earth metal oxides, the process according to the invention can be carried out with the use of only a single solution which, besides an alkali metal silicate, contains at least one metal, preferably cobalt, in the form of any desirable alkali stable water soluble compound. Aqueous solutions containing the alkali metal silicates offer special advantages.

The coating can be applied by treating the surfaces to be coated with the treating solutions according to the invention in a known manner, for example, dipping, spraying or painting, and thereafter as a rule the object which has been coated with such solution is dried in air with heating. In certain instances, however, when the object is subsequently to be used at higher temperatures, it is not necessary to heat while drying the coating and the coating can be simply dried at room temperature in air.

When the coating solutions are dried in air at elevated temperatures, temperatures over 100° C. are employed. Preferably, however, the drying temperature does not exceed 400° C. as, at higher temperatures, depending upon the composition of the solution, partial fusion of the coating can occur and such fusion is only advantageous in certain individual instances. Preferably, the coatings are dried at temperatures between 100 and 250° C. Undried coatings and those which have been dried slowly at room temperature are soluble or swellable in water or the silicate solution from which they have been prepared and can therefore be washed off again from the base with the aid of such liquids. On the other hand, the coatings which have been dried at temperatures of 100° C. and over are hard and stabilized and do not dissolve or swell in water or the parent silicate solutions. Coatings which have been dried at such elevated temperatures can only be etched off from the metal base with the aid of strongly aggressive chemically active agents, such as, hydrofluoric acid, boiling alkali metal hydroxide solutions and the like.

The mixed silicate coatings obtained after the stabilizing heat treatment are non-crystalline and similar to those obtained by enameling or glazing. However, it is possible to produce even coatings according to the invention which are thinner than those obtained by enameling or glazing. For example, enamels and glazes which are smooth and even cannot be produced in thicknesses of less than 50μ.

Especially good adherence to the base is achieved when the metal surface upon which the coating is applied is a metal which has a high affinity for oxygen, such as, for example, Al, Fe or Cr. Consequently, when an especially good adherence is desired upon other metal bases, it can be advantageous to apply a thin coating, for example, of Al, Fe or Cr, to such base by evaporation, galvanizing or any other method before applying the silicate solution according to the invention. The adherence obtained can furthermore be substantially increased by preoxidizing the metal surface to which the silicate solution is applied.

The mixed silicate coatings obtained according to the invention which have been stabilized by drying at elevated temperatures can furthermore be rendered more adherent to the metal base by an aftertreatment at elevated temperatures, for example, between 400 and 700° C. During such aftertreatment, a portion of the metal base reacts to form a mixed oxide within the silicate coating. This leads to a substantial increase in the surface hardness of the coating and renders such coating more resistant mechanically. In certain instances, the after-heat treatment can be carried out to such an extent that the coating fuses. Metallic vapor coatings, for example, mirror or reflective coatings which have been coated with a mixed silicate layer according to the invention, can be caused to dissolve in the mixed silicate coating by an after-treatment at 500–700° C. with access to air. This after-heat treatment can be so regulated that a predetermined amount of the metal coating underlying the mixed silicate coating is transformed to the non-metallic state and taken up by the mixed silicate coating, so that the permeability to light of the metal coating is gradually altered. The removal of the reflective metal coating can be effected locally by locally treating the mixed silicate coated metal coating at different temperatures and/or different lengths of time and it is possible to produce a continuous change in the light absorption of the metal coating so that effects can be obtained such as are desired in anti-glare glasses. When aluminum is used in the reflective metal coating underlying the mixed silicate coating, a temperature of about 550° C. can be used for the after-heat treatment by removal of aluminum from such metal coating. When copper is used for the reflective metal coating, the temperature should be at least 650° C. The duration of the after-heat treatment depends upon the temperature employed and the proportion of the metal to be taken up from the metal coating by the mixed silicate coating.

It is expedient to heat the metal base before application of the silicate solution according to the invention when such base has bent surfaces or is profiled as such heating favors complete wetting of the bent or profiled surfaces.

In the production of the silicate solutions according to the invention, a portion of the water can be replaced by water soluble organic substances such as alcohols, aldehydes, ketones, and the like, in order to improve the distribution of the solutions and accelerate their drying.

Surface coatings according to the invention which are not wetted by water can be produced according to the invention by incorporating polymerizable organic substances in the silicate solution and drying the mixed silicate coating at temperatures at which such substances polymerize. Water repellent coatings can also be produced by aftertreatment of the stabilized mixed silicate coatings according to the invention with suitable organic substances, for example, organic silicon compounds, such as, the silicones, or with isocyanates. Furthermore, the mixed silicate coatings can be colored by the addition of coloring matter.

The following examples serve to illustrate several modifications of the process according to the invention.

*Example I*

A silicate treating solution was prepared by mixing 10 cc. of commercial water glass ($Na_2O:SiO_2=1:3.4$–4, $d=1.33$), 50 cc. of $H_2O$ and 15 cc. of an aqueous solution of sodium cobalt (3) nitrite containing 1 gram of cobalt per liter. The resulting solution was brown or blue colored depending upon the status of the cobalt complex solution employed. When such complex solution was boiled for some time, that is about 20 minutes, to decompose a portion of the complex before it was mixed with the water glass solution, a clear blue treating solution is obtained. Mixed silicate coatings according to the invention obtained from the blue treating solutions had a greater hardness and adherence to the metal base.

A brass sheet was coated with the treating solution and was then dried at 150° C. The resulting mixed silicate coating protected the brass from tarnishing in air and fully protects such brass against the formation of patina.

The solution was also employed in a similar manner to coat sheet iron, namely, so-called transformer sheet, to furnish an insulating coating thereon. The coatings thus obtained of a thickness under 0.001 mm. had a specific resistance of 106 ohm per cm. at temperatures up to 200° C.

The solution of sodium cobalt (3) nitrite is produced by dissolving the commercial salt in water.

*Example II*

A silicate treating solution was prepared by mixing 10 cc. of commercial water glass ($d=1.33$) with 36 cc. of $H_2O$, 4 cc. of ethyl alcohol and 10 cc. of an aqueous solution of sodium cobalt (3) nitrite containing 1 gram of cobalt per liter.

Iron objects were separately coated with such solution with intermediate drying of each coating at 105° C. The individual coatings were 0.003 to .01 mm. thick. The coating thus obtained afforded excellent protection of the iron objects against rust.

*Example III*

A silicate treating solution was prepared by mixing 10 cc. of commercial water glass ($d=1.33$) with 10 cc. of $H_2O$, 6 cc. of an aqueous lead nitrate solution containing 10 grams of lead per liter and 20 cc. of an aqueous sodium cobalt (3) nitrite solution containing 1 gram per liter of cobalt.

This solution when applied to aluminum, aluminum alloys and other light metals produced coatings of an especially low melting point and when such coatings were fused, they were glass smooth and evened out all of the microscope surface roughnesses of the metal base. The skin friction of metal sheets in air is substantially reduced by such a fused coating. The articles made of aluminum may be heated to 450° C. before application of the solution.

*Example IV*

A silicate treating solution was prepared by mixing 10 cc. of water glass, 6 cc. of $H_2O$, 4 cc. of an aqueous sodium cobalt (3) nitrite solution containing 1 gram per liter of cobalt, 1 cc. of an aqueous copper sulfate solution containing 1 gram per liter of copper and 3 cc. of an aqueous solution of benzaldehyde containing 1 gram of benzaldehyde per liter.

This solution was employed to provide a scratch resistant coating over glasses provided with a reflective metal coating applied by vapor or chemical means. Such coating did not exhibit interference colors. When such coating was dried at temperatures above 130° C. it became water repellent and could no longer be wetted by water droplets. When such coating was heated to temperatures above 500° C., it slowly attacked the underlying thin reflective metal coating, for example, of aluminum, to reduce its reflective character. The reflective coating could even be caused to disappear entirely in this manner. The mixed silicate coating is exceptionally well suited for the local reduction or removal of the reflective characteristics of eye glasses provided with reflective metal coatings and for the production of metal coated mirrors with a wedge shaped decrease in coating thickness.

*Example V*

A silicate treating solution was prepared by mixing 10 cc. of water glass ($d=1.33$) with 12 cc. of water, 1.2 cc. of acetone and 9 cc. of an aqueous silver nitrate solution containing 3 grams of silver per liter.

This solution when applied to non-scaling resistant metals, such as, nickel, nickel alloys and certain hard metals, was found to protect such metals against scaling at high temperatures, for example, between 600–1000° C. When the coating is to be applied in several layers, the individual layers were dried at temperatures between 200 and 250° C. before application of the next layer.

*Example VI*

A silicate treating solution was prepared by mixing 10 cc. of water glass ($d=1.33$) with 10 cc. of $H_2O$, 5 cc. of an aqueous sodium cobalt (3) nitrite solution containing 1 gram of cobalt per liter and 12 cc. of an aqueous zinc nitrate solution containing 2 grams of zinc per liter.

This solution was applied to zinc plate, zinc armatures and other zinc objects and dried at 120° C. whereby a hard, rub-fast protective coating was obtained which prevented corrosion of the zinc by moist air and prevented such zinc from becoming cloudy and dull.

*Example VII*

A silicate treating solution was prepared by mixing 10 cc. of a water glass solution ($d=1.33$) with 10 cc. of water, 7 cc. of an aqueous potassium chromate solution containing 0.2 gram of chromium per liter and 7 cc. of an aqueous solution of potassium ferric cyanide containing 0.2 gram of Fe per liter. This solution was applied to silver or silver plated articles whereby said articles were cold dipped into the solution and the excess solution afterwards removed in a centrifuge. After having been dried the articles are once more but still hot dipped in the solution at a temperature of 200° C. during a period of 10 minutes. The articles are then centrifuged and dried at a temperature of 200° C. A silver surface treated in accordance with this prescription is resistant to tarnishing in the air because of the protective mixed silicate coating, which coating is applied in a thickness of 0.001 to 0.002 mm.

*Example VIII*

A silicate treating solution was prepared by mixing 10 cc. of a water glass solution ($d=1.33$) with 10 cc. of $H_2O$, 9 cc. of an aqueous sodium arsenate solution containing 0.2 gram of arsenic per liter and 5 cc. of an aqueous copper sulfate solution containing 0.2 gram of Cu per liter to which a sufficient amount of potassium sodium tartarate had been added to render such copper sulfate solution stable to alkali. Articles made of copper, brass or bronze are heated to a temperature of 80° C. and afterwards sprayed (by means of a spraying pistol) with the solution for at least 5 seconds until a coherent uniform layer has been formed on these articles. When dried at a temperature of 150 to 200° C. this layer forms a compact mixed silicate film which prevents a scaling of the base metal when using the thus treated articles at temperatures up to 400° C.

This is a continuation-in-part of application Serial No. 494,217, filed March 14, 1955.

I claim:

1. A process for the surface treatment of metals which comprises applying a coating of an alkaline aqueous solution of an alkali metal silicate in which the proportion of alkali metal oxide to silicon dioxide is 1:2.5 to 1:5 and 0.05% to 2%, based upon the weight of the alkali metal silicate, of at least one heavy metal in the form of an alkali stable and water soluble compound over the metal surface to produce a non-crystalline silicate containing coating, drying the coating and heating the coating to a temperature between 100 and 400° C.

2. The process of claim 1 in which the quantity of heavy metal is 0.2% to 1% based upon the weight of the alkali metal silicate.

3. A process according to claim 1 in which said heavy metal compound is a compound of a multivalent heavy metal.

4. A process according to claim 1 in which said heavy metal compound is a cobalt compound.

5. A process according to claim 1 in which the coating applied is less than $50\mu$ thick.

6. A process according to claim 1 in which the coating is applied to a thin metal layer produced by evaporating such metal onto a base under vacuum.

7. A process according to claim 1 in which the metal surface over which the coating is applied is an oxidizable metal and such metal is oxidized before application of the silicate containing coating.

8. A process according to claim 1 comprising in addition subjecting the coating to an after-heat treatment above 400° C.

9. A process according to claim 1 comprising in addition subjecting the coating to an after-heat treatment between 400° and 700° C.

References Cited in the file of this patent

UNITED STATES PATENTS

| | | |
|---|---|---|
| 1,395,451 | Palmer | Nov. 1, 1921 |
| 2,462,763 | Nightingall et al. | Feb. 22, 1949 |
| 2,529,206 | Winslow et al. | Nov. 7, 1950 |
| 2,680,085 | Raeuber et al. | June 1, 1954 |
| 2,832,705 | Seidl | Apr. 29, 1958 |